United States Patent
Cordeiro et al.

(10) Patent No.: US 9,014,638 B2
(45) Date of Patent: Apr. 21, 2015

(54) METHODS AND SYSTEMS FOR EXTENDING RANGE AND ADJUSTING BANDWIDTH FOR WIRELESS NETWORKS

(75) Inventors: Carlos M. Cordeiro, Ossining, NY (US); Dagnachew Birru, Yorktown Heights, NY (US); Monisha Ghosh, Chappaqua, NY (US)

(73) Assignee: Koninklijke Philips N.V., Eindhoven (NL)

(*) Notice: Subject to any disclaimer, the term of this patent is extended or adjusted under 35 U.S.C. 154(b) by 1123 days.

(21) Appl. No.: 12/280,223

(22) PCT Filed: Feb. 20, 2007

(86) PCT No.: PCT/IB2007/050548
§ 371 (c)(1),
(2), (4) Date: Aug. 21, 2008

(87) PCT Pub. No.: WO2007/096821
PCT Pub. Date: Aug. 30, 2007

(65) Prior Publication Data
US 2010/0203911 A1    Aug. 12, 2010

Related U.S. Application Data

(60) Provisional application No. 60/776,183, filed on Feb. 23, 2006, provisional application No. 60/817,570, filed on Jun. 28, 2006.

(51) Int. Cl.
*H04B 1/00* (2006.01)
*H04W 88/08* (2009.01)
*H04W 16/28* (2009.01)
*H04W 80/00* (2009.01)

(52) U.S. Cl.
CPC .............. *H04W 88/08* (2013.01); *H04W 16/28* (2013.01); *H04W 80/00* (2013.01)

(58) Field of Classification Search
CPC ..................................................... H04W 16/28
USPC .................. 455/63.4, 501, 507; 342/359, 372
See application file for complete search history.

(56) References Cited

U.S. PATENT DOCUMENTS

| | | | |
|---|---|---|---|
| 6,094,439 A * | 7/2000 | Krishna et al. | 370/445 |
| 6,188,913 B1 * | 2/2001 | Fukagawa et al. | 455/562.1 |
| 2002/0113743 A1 | 8/2002 | Judd | |
| 2006/0251004 A1 * | 11/2006 | Zhong et al. | 370/318 |

FOREIGN PATENT DOCUMENTS

| | | | | |
|---|---|---|---|---|
| EP | 1641180 A1 | | 3/2006 | |
| NL | WO2004077762 | * | 2/2004 | H04L 12/56 |

* cited by examiner

*Primary Examiner* — Hsin-Chun Liao
(74) *Attorney, Agent, or Firm* — Larry Liberchuk

(57) ABSTRACT

A Communications base-station configured to operate as a hub in a wireless network and provide communication services to a set of remote customer devices using a wireless protocol is disclosed. The communications base-station includes an antenna array having a plurality of antennae arranged in a fashion as to enable the antenna array to transmit and receive wireless signals in both a substantially omnidirectional and non-omnidirectional pattern, a physical layer (PHY) device coupled to the antenna array and configured to transmit and receive wireless signals and a media access control (MAC) device coupled to the PHY device and configured to direct the antenna array to concurrently provide beamformed wireless signals to a first customer device and omnidirectional wireless signals to second customer device.

12 Claims, 9 Drawing Sheets

METHODS AND SYSTEMS FOR EXTENDING RANGE AND ADJUSTING BANDWIDTH FOR WIRELESS NETWORKS

BACKGROUND

Currently existing wireless communication systems, including those designed to perform personal/local/metropolitan/wide/regional area network (respectively, PAN, LAN, MAN, WAN, and RAN) services, tend to be inflexible and limited.

For example, current wireless LAN systems, such as an 802.11 wireless LAN, have a very limited range and can only accommodate terminals with a single frequency bandwidth capability. This requires that all terminals willing to connect to an 802.11 wireless LAN must be located within a certain range of a base-station/hub and adhere to the same bandwidth characteristics as all other terminals.

Given that the designers of wireless technologies have emphasized the need for PANs/LANs/MANs/WANs/RANs to cover wider geographic areas and serve a wider variety of remote terminals having different data needs, new technology relating to wireless communications systems is desirable.

SUMMARY

In a first embodiment, a communications base-station configured to operate as a hub in a wireless network and provide communication services to a set of remote customer devices using a wireless protocol includes an antenna array having a plurality of antennae arranged in a fashion as to enable the antenna array to transmit and receive wireless signals in both a substantially omnidirectional and non-omnidirectional pattern, a physical layer (PHY) device coupled to the antenna array and configured to transmit and receive wireless signals and a media access control (MAC) device coupled to the PHY device and configured to direct the antenna array to concurrently provide beamformed wireless signals to a first customer device and omnidirectional wireless signals to second customer device.

In a second embodiment, a method to provide communication services by a communications base-station to a set of remote customer devices using a wireless protocol includes receiving wireless signals of the wireless protocol transmitted by a plurality of customer devices having different directions relative to the communications base-station, and concurrently demodulating the received wireless signals for a first customer device using a beamformed wireless technique and for a second customer device using an omnidirectional wireless technique.

In a third embodiment, a communications base-station configured to operate as a hub in a wireless network and provide communication services to a set of remote customer devices using a wireless protocol includes a media access control (MAC) device configured to extract data from wireless signals transmitted from a first customer device using a default frequency bandwidth, then reconfigure the default frequency bandwidth to a first updated frequency bandwidth different from the default frequency bandwidth such that data from subsequent wireless signals transmitted from a first customer device is extracted using the updated frequency bandwidth.

In a fourth embodiment, a method to provide communication services by a communications base-station to a set of remote customer devices using a wireless protocol includes receiving wireless signals from a first customer device using a default frequency bandwidth, receiving bandwidth information from the first customer device describing the frequency bandwidth capabilities of the first customer device, wherein the frequency bandwidth capabilities of the first customer device are different from the default frequency bandwidth, reallocating a portion of the frequency bandwidth of the wireless protocol based on the received bandwidth information to produce an updated frequency bandwidth for use with the first customer device, and receiving wireless signals from the first customer device using the updated frequency bandwidth.

In a fifth embodiment, a wireless communications system includes a plurality of customer devices using a first wireless protocol and having a variety of different frequency bandwidth capabilities, and a base-station configured to operate as a hub in a wireless network that includes the plurality of customer devices, wherein the base-station is configured to initially communicate with each customer device using a common default frequency bandwidth, then subsequently communicate with each customer device using a respective updated frequency bandwidth based on the respective frequency capability of each customer device.

DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The use of more than one antenna in wireless communications systems can improve range and system capacity by adapting, i.e., beamforming, the antenna pattern and concentrating its radiation to each individual terminal. While increased capacity can be relatively easy to achieve, efficient solutions that allow the exploitation of the increased range provided by Adaptive Antenna Systems (AAS) are not trivial. As a result, even though AAS may be supported by a particular base-station, the resultant coverage may nonetheless be limited to that of an omnidirectional antenna pattern.

The present disclosure provides for the exploitation of the increased range provided by adaptive antenna systems by, among other things, adding a special "Alert Window" (AW). The AW has a temporal position in a wireless protocol that is known or otherwise identified to those using the wireless system. As may be appreciated, certain terminals can be located beyond the omnidirectional range of a base-station's transmitter, and thus cannot reliably decode data but that may still be able synchronize to the base-station. The use of the AW allows a given terminal to signal the base-station of its presence, then allows the base-station to detect the terminal and subsequently configure its AAS to generate a beamformed pattern towards the terminal's direction. The derived benefits of the AW thus include both range extension and the accommodation of new terminals.

In addition, the AW (or a separate "ranging window") can be used to allow any terminal to provide its frequency bandwidth capabilities to a base-station. Notably, the AW (or the separate ranging window) can be set to a default/basic frequency bandwidth requirement. As a result, the use of the AW or ranging window can allow the base-station and remote terminal to advantageously communication using a known/default set of frequency parameters to negotiate and upgrade to using different frequency bandwidths and different frequency ranges.

Figure 1:
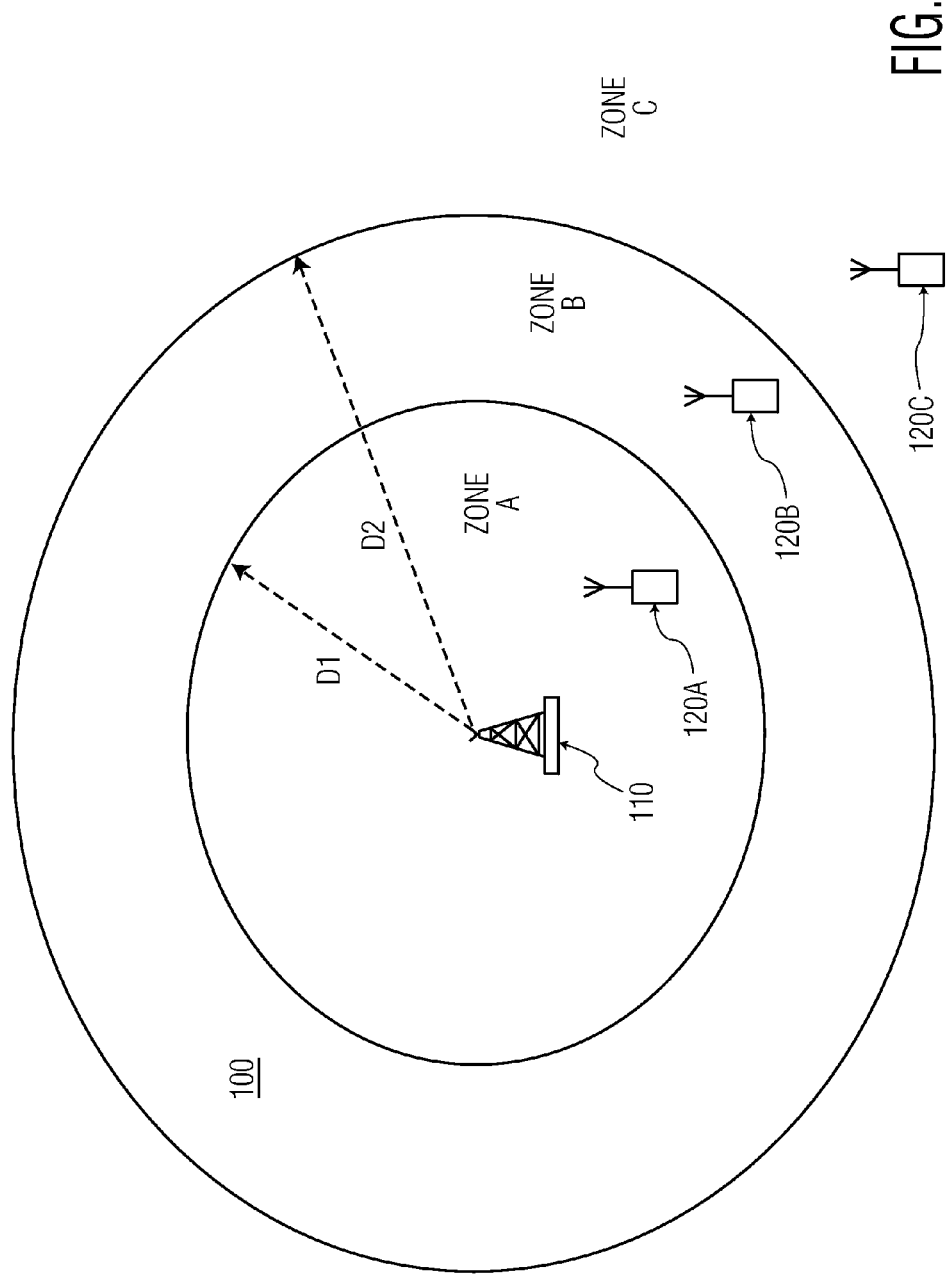
FIG. 1 depicts a communications base-station surrounded by various customer premise equipment located in concentric operational zones.

FIG. 1 depicts a communications system 100 having a base-station 110 surrounded by various customer premise equipment (CPE) 120A, 120B and 120C located in concentric operational zones A, B and C. Zone A represents a region where CPEs can reliably transmit and receive wireless signals to/from the base-station 110; zone B represents a region where CPEs may intermittently transmit and receive wireless signals to/from the base-station 110 (or perhaps only receive enough of a transmission signal from the base-station to extract timing information but not data); and zone C represents a region outside zones A and B where CPEs are effectively isolated from the base-station 110.

Figure 2:
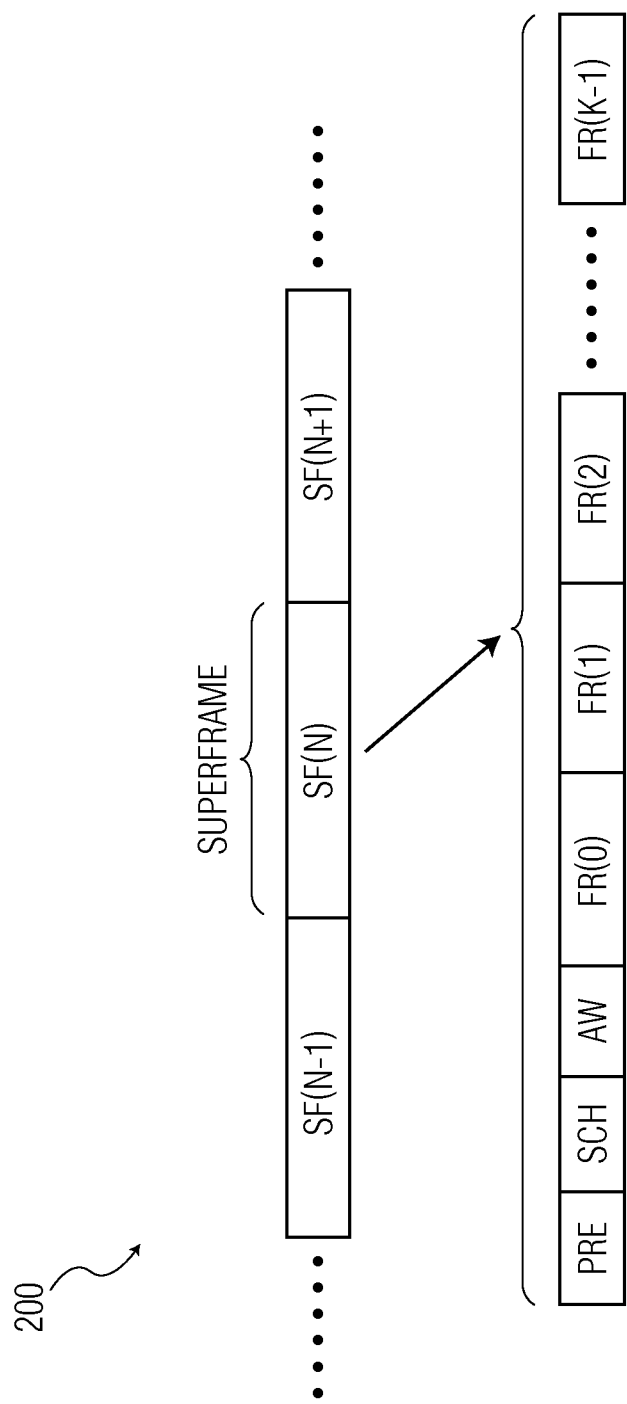
FIG. 2 depicts the superframe structure of the wireless protocol used by the communications base-station of FIG. 1.

In operation, the base-station 110 can transmit according to a predetermined wireless protocol, such as a communications protocol having various superframes, frames, etc., as well as special reserved communication windows and special sequences of data used for establishing synchronization and timing, such as that discussed with respect to FIG. 2. As shown in FIG. 2, the wireless protocol 200 has a series of superframes SF(n) with each superframe SF(n) having K number of frames FR(m) with the frames FR(m) being preceded by a preamble PRE, a superframe control header SCH and an alert window AW.

The preamble PRE can be used for time synchronization, AGC setting and channel estimation.

The superframe header SFH contains information, such as the type of system the base-station employs, the channel frequencies used, the identity of which frames FR(m) are bonded and which are not, the presence/absence of the AW window, quiet periods and so on. It is emphasized that the SFH information noted is merely illustrative and that other types of information are contemplated for inclusion therein.

The alert window AW is a special time period in which CPEs can send special messages to a base-station or attempt to initially contact or register with a base-station.

Returning to FIG. 1, any of the CPEs 120A or 120B that are not isolated from the base-station 110 and desire to register with the base-station 110 can use the base-station's wireless protocol to synchronize to the base-station's timing and perhaps to identify characteristic of the base-station. Note that, due to the relative distances, CPE 120B may be capable of only extracting timing information, and CPE 120C may not be able to even sense the existence of the base-station 110, much less extract data and timing information.

Once a CPE 120A or 120B has extracted timing information and synchronized to the base-station 110, the CPE 120A or 120B can transmit a burst signal, or packet, to the base-station 100 during an AW (or similarly situated time window) of the base-station's protocol.

Assuming that the base-station 110 receives the registration packet with sufficient power, such as would happen for CPE 120A, the base-station 100 can allow the CPE 120A access using an omnidirectional antenna pattern.

However, assuming that the base-station 110 receives a registration packet having a questionable power level, or a power level so low that the base-station 110 cannot extract data, the base-station 110 may nonetheless want to establish contact with the marginal CPE. For the exemplary embodiment of FIG. 1, this may require that the base-station 110 estimate the relative direction of the marginal CPE.

Figure 3A:
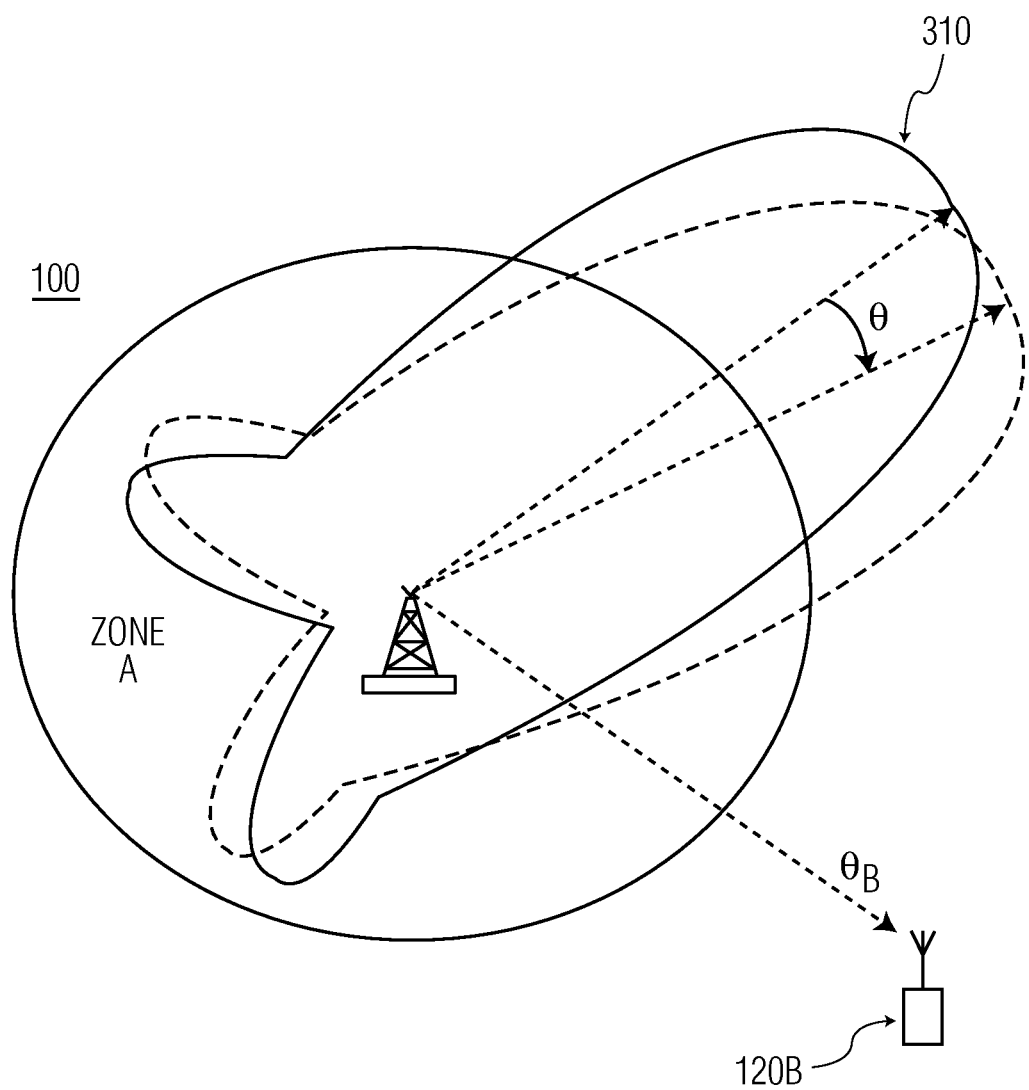
FIGS. 3A and 3B depict the communications base-station of FIG. 1 using a beamformed pattern to establish communication with a remote device.

For example, as shown in FIG. 3A, the base-station 110 of FIG. 1 can repeatedly sweep a beamformed pattern 310 about itself in angular increments θ. As the beamformed pattern 310 sweeps across CPE 120B, the power level of any registration packets received by the base-station 110 from the CPE 120B will show a maximum magnitude as the beamformed pattern 310 reaches the relative direction $\theta_B$ of the CPE 120B. The base-station 110 can optionally then do repeated 360 degree scans, fine angle scans about angle $\theta_B$ or any number of other scanning/estimation techniques using a beamformed pattern, as well as change the shape of the beamformed pattern 310, until the base-station 110 has settled on an appropriate angular estimate.

Figure 3B:
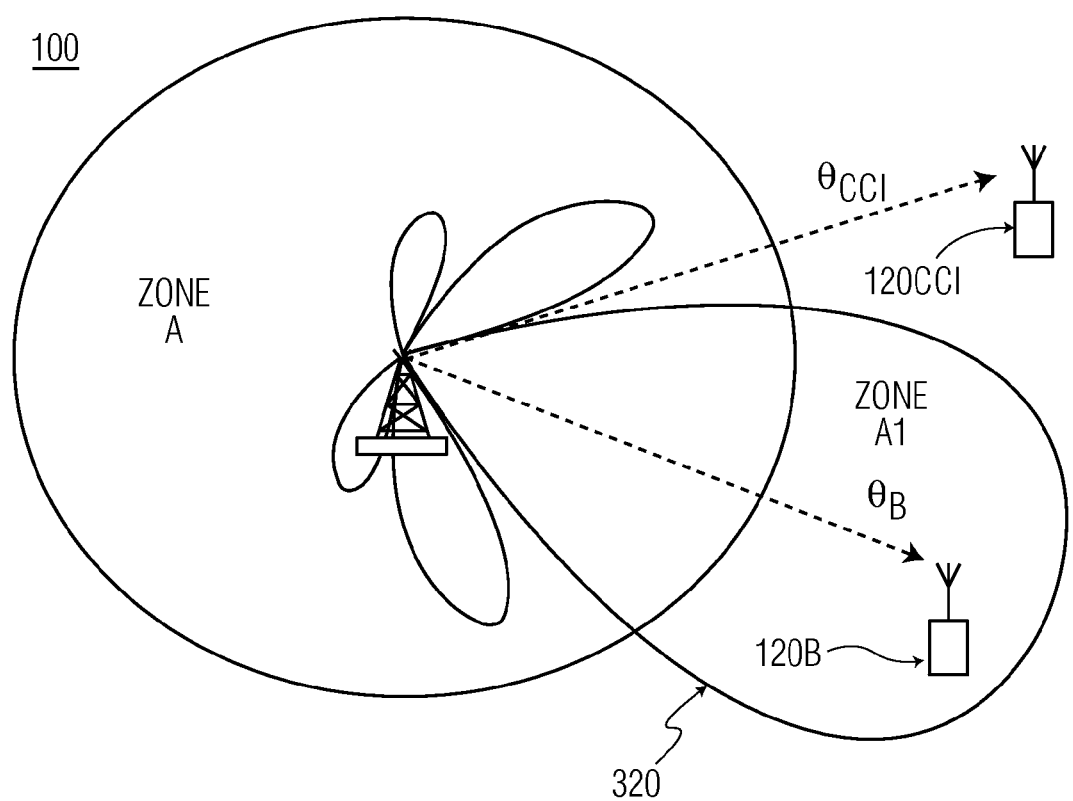

Continuing to FIG. 3B, once a relative angle for CPE 120B has been estimated, the base-station 110 can optionally apply any number of adaptive processes to change the shape of the beamformed pattern 310 to form an adaptive beamformed pattern 320 that can incorporate one or more rejection bands capable of rejecting interference signals from various sources. For the example of FIG. 3B, an exemplary rejection band at relative angle $\theta_{CCI}$ is depicted that should reject the majority of energy transmitted by the exemplary interference source 120CCI.

Once the presence of CPE 120B is known to the base-station 110, the base-station 110 can store information relating to CPE 120B in a database for later retrieval such that communications with CPE 120B can be re-established without using a second scan and (optional) adaptation process. Also note that a scan procedure can be bypassed if either relative direction information or an absolute geographic location (e.g., latitude and longitude) of a CPE can be provided to the base-station 110 via a message from the respective CPE, from a database or from some other route.

Figure 4:
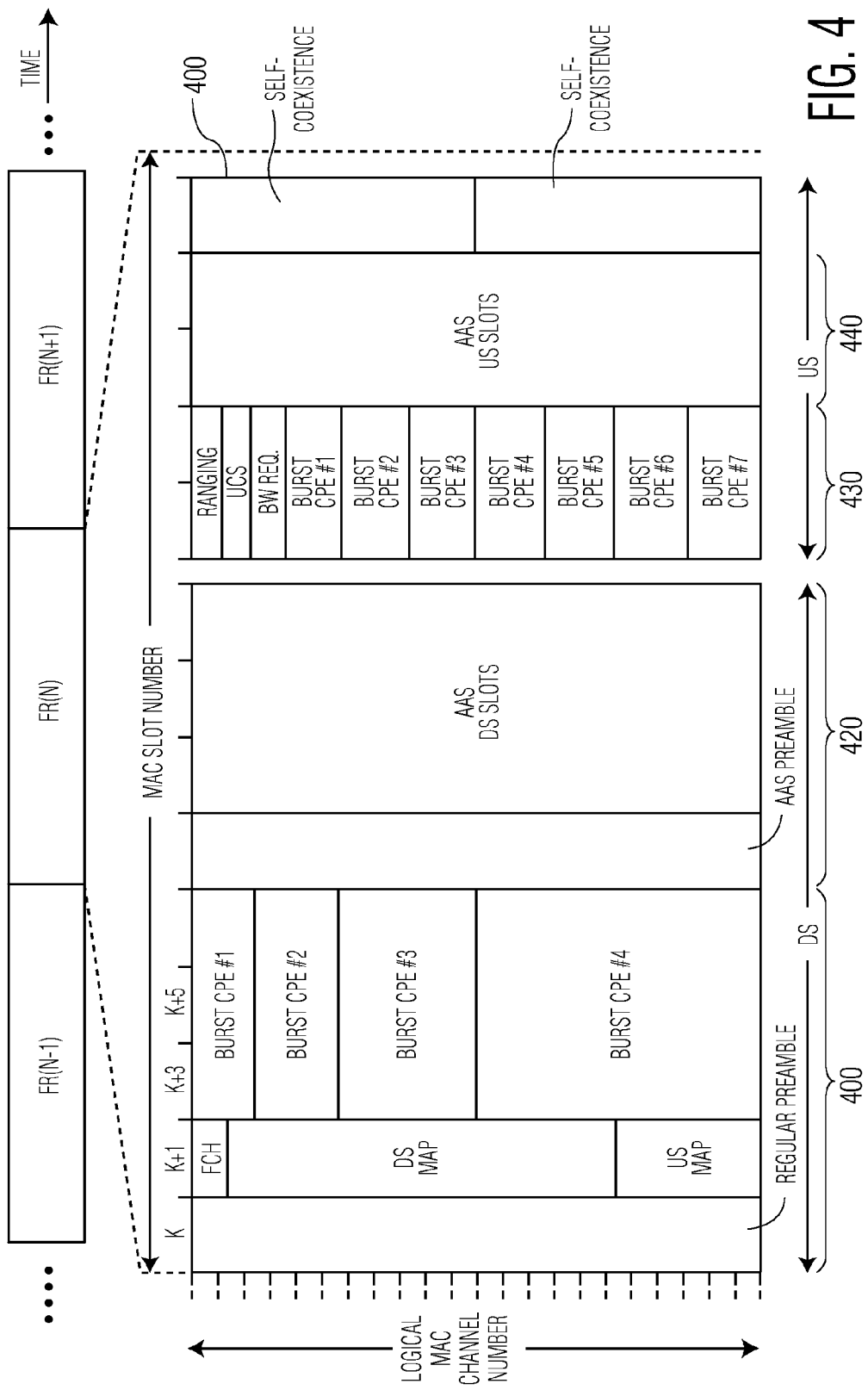
FIG. 4 depicts the frame structure of the wireless protocol used by the communications base-station of FIG. 1.

Once the base-station 110 has estimated the appropriate direction (and optionally estimated a beamform pattern with one or more rejection bands), the base-station 110 can start communicating with CPE 120B concurrently while communicating with CPE 120A. In order to facilitate concurrent communications, the base-station 110 can use a special frame protocol, such as the exemplary frame 400 discussed with respect to FIG. 4. As shown in FIG. 4, the frame 400 is divided into two main portions: a downstream portion DS for transferring data from a base-station to a CPE, and an upstream portion US for transferring data from a remote CPE to a base-station.

Note that both the downstream portion DS and upstream portion US are divided into two separate sections 410/420 and 430/440 with section 410 being used for downstream data transfer (via an onmidirectional antenna pattern), section 420 being used for downstream data transfer (via a beamformed antenna pattern), section 430 being used for upstream data transfer (via an onmidirectional antenna pattern) and section 420 being used for upstream data transfer (via a beamformed antenna pattern). Also note that sections 410 and 420 can have separate preambles used for transmitting omnidirectional and beamformed signals respectively.

By using an appropriate communications protocol, such as the frame 400 of FIG. 4, a communication device, such as the base-station 110 of FIG. 1, can concurrently transmit and receive packets to/from remote devices using both onmidirectional and beamformed antenna patterns. However, note than while frame 400 has but a single downstream beamformed section 420 and upstream beamformed section 440, frame 400 can be modified to have multiple upstream and downstream beamformed sections servicing different CPEs or different groups of CPEs.

Returning to FIG. 1, as mentioned above the exemplary communication system 100 has a second tool for improving communications. More particularly, the non-isolated CPEs 120A and 120B can negotiate with the base-station 110 according to a frequency update procedure in such a way so as each CPE 120A and 120B can use different frequency bandwidths as well as different frequency ranges.

In operation, such a frequency update procedure can begin with a CPE 120A or 120B registering with the base-station 110 using a default frequency bandwidth, which can represent some minimal amount of frequency bandwidth and optionally a limited frequency range. During the registration procedure, the CPE 120A or 120B can send information to the base-station 110 relating to its intrinsic capabilities.

For example, in a particular embodiment, CPE 120A can register with base-station 110 using a center frequency of 55 Mhz (TV Ch #2) and a basic bandwidth of 6 MHz (a TV channel bandwidth in many countries). The CPE 120A can then inform the base-station 110 that it is capable of transmitting data to the base-station 110 over a frequency bandwidth of, for example, 12 MHz and is capable of receiving data from the base-station 110 using a frequency bandwidth of 18 MHz. Assuming that the base-station 110 has the available bandwidth, the base-station 110 can change its operating parameters and initiate communications with the CPE 120A using the respective 12 MHz and 18 MHz bandwidths. On the other hand, assuming that only 12 MHz bandwidth is available for upstream and downstream communications, the base-station 110 can reserve some or all of the available 12 MHz bandwidth to the CPE 120A.

Once the appropriate bandwidth is reserved/updated, the base-station 110 can notify the CPE 120A of the particular bandwidth reserved for communication, and when such communications bandwidth will be used. Subsequently, the CPE 120A can reconfigure itself to accommodate the reserved/updated bandwidth and frequency ranges. Note that the notification can occur, for example, using the SCH field shown in FIG. 2 or by using some other predetermined methods.

Using the above-discussed approach, it should be appreciated that the base-station 110 can simultaneously support CPEs having a variety of different capacities, i.e., that use a variety of bandwidths and are capable of receiving and transmitting in a variety of different spectra.

Figure 5:
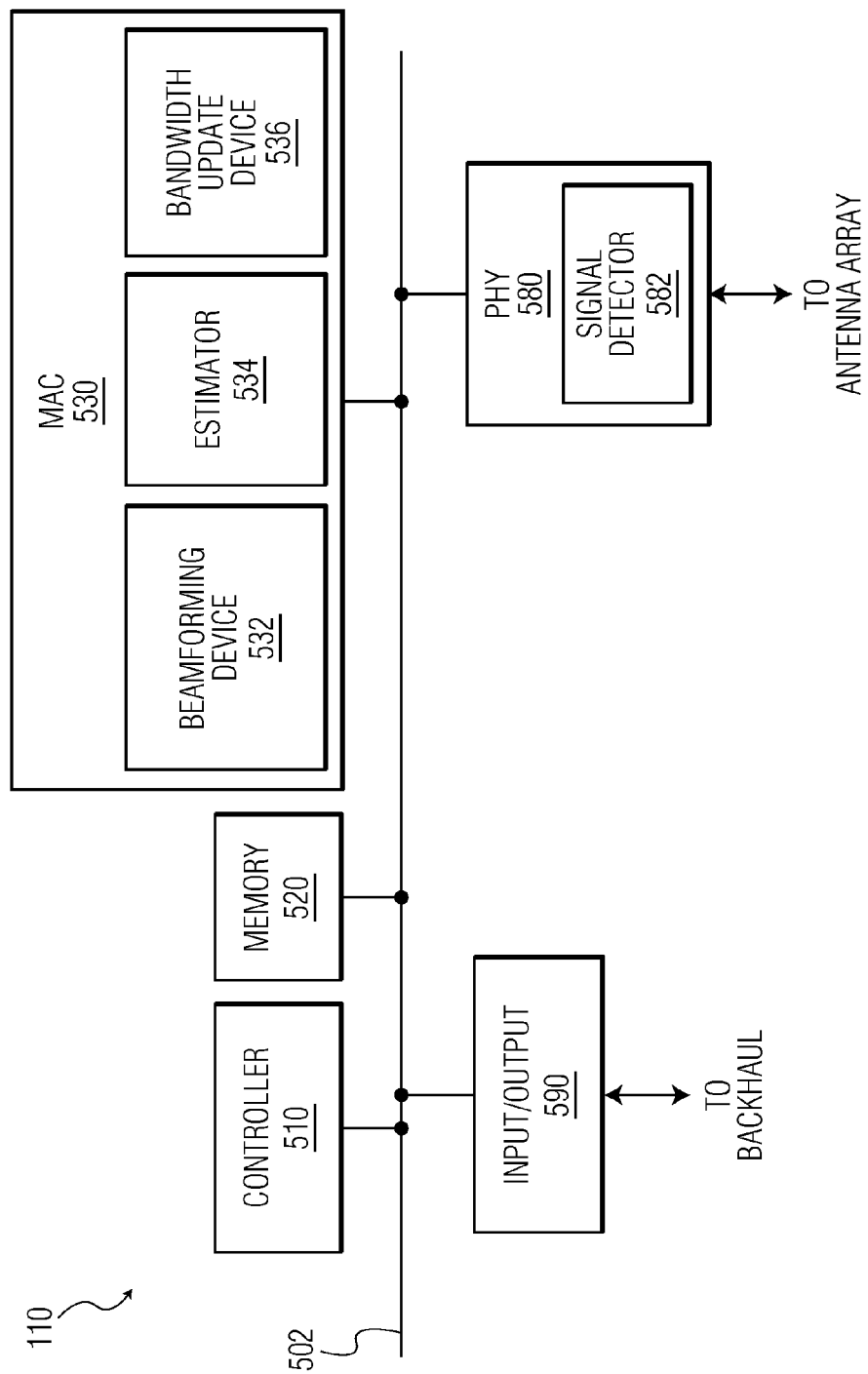
FIG. 5 is a block diagram of the communications base-station of FIG. 1.

FIG. 5 is a block diagram of the communications base-station 110 of FIG. 1. As shown in FIG. 5, the exemplary base-station 110 includes a controller 510, a memory 520, a media access controller (MAC) device 530, a physical layer (PHY) device 580 and an input/output device 590. The MAC device 230 includes a beamforming device 532, an estimator 534 and a bandwidth update device 236. The PHY device 580 includes a signal detector 582 and has a link capable of coupling to an antenna array (not shown). The input/output device 290 can be coupled to a communication backbone via any number of wired or wireless technologies.

Although the exemplary base-station 110 of FIG. 5 uses a bussed architecture, it should be appreciated that any other architecture may be used as may be known to those of ordinary skill in the art. For example, in various embodiments, the various components 510-590 can take the form of separate electronic components coupled together via a series of separate busses or a collection of dedicated logic arranged in a highly specialized architecture.

It also should be appreciated that some of the above-listed components 530-580 can take the form of software/firmware routines residing in memory 520 and be capable of being executed by the controller 510, or even software/firmware routines residing in separate memories in separate servers/computers being executed by different controllers.

Still further, it should also be appreciated that various remote customer devices may possess similar components with similar functionality to those components 510-590 shown in FIG. 5 and described herein with the caveat that such components on a remote costumer device may not need to possess the same complexity as the components 510-590 the base-station 110 and so some of the components in FIG. 2 can be omitted (e.g., the synchronization device 234).

Returning to FIG. 5, the exemplary base-station 120 can start operation by transmitting a wireless signal according to a particular wireless protocol, such as the protocol outlined in FIGS. 2 and 4.

In a first series of operations, the base-station 110 can make contact with one or more first CPEs using an omnidirectional antenna pattern as well as one or more second CPEs using a beamformed antenna pattern.

In order to secure communications using a beamformed antenna pattern, the base-station 110 can use the beamforming device 532 in the MAC device 530 to cause an antenna array to scan the surrounding area using a beamformed pattern, such as the pattern 310 shown in FIG. 3A. During the scanning process, the signal detector 582 can be used to sense CPE signals and measure the signal strength of each signal transmitted by each CPE, and the estimator 534, using angular information provided by the beamforming device 532 and signal strength information from the signal detector 582, can estimate (to a reasonable accuracy) the relative directions of each CPE—as well as the relative direction of various sources of interference, such as a distant television station.

Using this information, the beamforming device 532 can not only provide an advantageous beamformed pattern to a CPE, but also optionally adapt the a beamformed pattern to maximize signal strength from the CPE of interest relative to the signals of various interference sources in a manner such as that depicted in FIG. 3B.

Once an appropriate beamformed pattern is determined and communications established with the CPE of interest, the exemplary base-station 110 can communicate with the CPE using any number of frame structures, such as the frame structure of FIG. 4, which supports concurrent communications using both omnidirectional and beamformed communication patterns.

Figure 6:
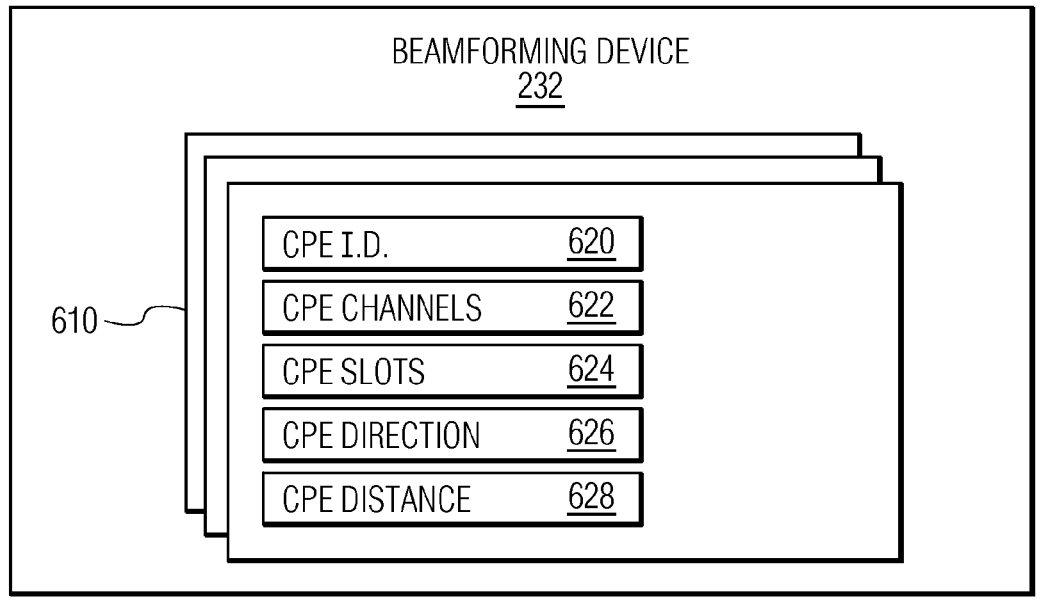
FIG. 6 depicts a portion of a beamforming device located in the MAC of the communications base-station of FIG. 5.

FIG. 6 depicts a particular record 610 for use in the beamforming device 534 of FIG. 5. As shown in FIG. 6, the exemplary record 610 includes some form of CPE identification field 620, the channels 622 and slots 624 assigned for use with the CPE (see, e.g., FIG. 4 for reference), the relative direction 626 of the CPE and the relative distance 628 (if known) of the CPE. While not meant to be a comprehensive list of all information necessary or useful for a base-station to communicate with a CPE, the record 610 of FIG. 6 does provide a list of some of the more useful information for providing beamformed communications. Note that some or all of the record 610 of FIG. 6 can be stored in a database for later retrieval and use by the exemplary base-station 110.

Returning to FIG. 5, as mentioned above the base-station 110 is also capable of reconfiguring a frequency bandwidth and frequency range for any CPE communicating with the base-station 110. To that end, the bandwidth update device 536 can be configured to receive CPE configuration information using a default frequency bandwidth and range via the AW window of FIG. 2 or via part of some special registration or configuration message. Once the configuration information is received, the bandwidth update device 536 can reassign some or all of the frequency bandwidth from the base-station's protocol to service the CPE at issue, and then issue a command to the CPE to communicate with the base-station 110 using the updated/reassigned frequency bandwidth and frequency range.

Figure 7:
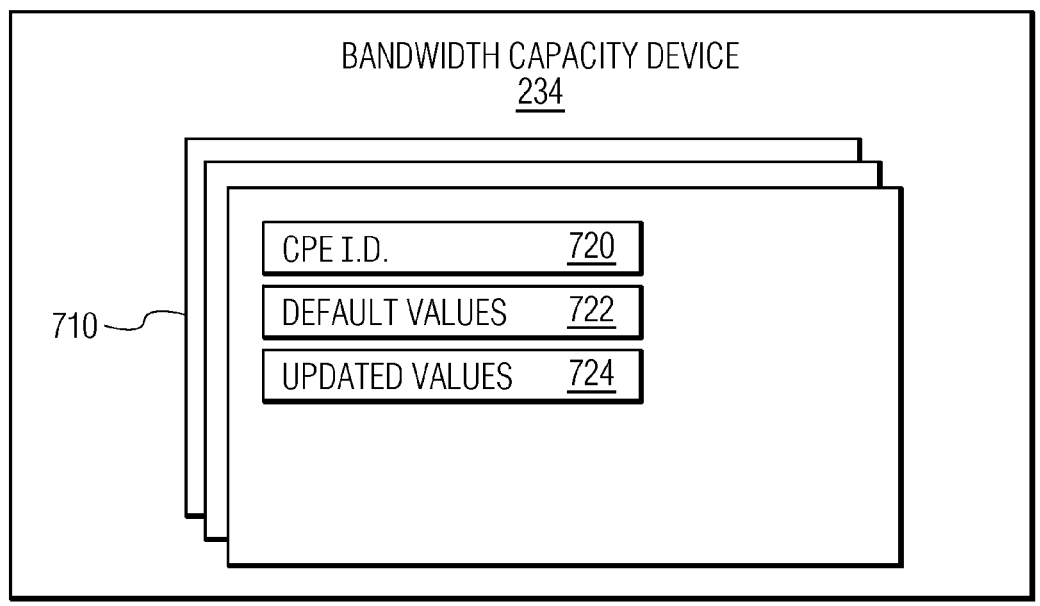
FIG. 7 depicts a portion of a frequency bandwidth device located in the MAC of the communications base-station of FIG. 5.

FIG. 7 depicts a particular record 710 for use in the bandwidth update device 536 of FIG. 5. As shown in FIG. 7, the exemplary record 710 can include some form of CPE identification field 720, a set of default communication fields 722 that include a default frequency bandwidth and range allocated to the CPE, and a set of updated communication fields 724 that includes an updated frequency bandwidth and range that the CPE is capable of using. While not meant to be a comprehensive list of all information necessary for a base-station to communicate with a CPE, the record 710 of FIG. 7 provides a list of some of the information useful for providing adaptive communications. Again note that some or all of the record 710 of FIG. 7 can be stored for later retrieval and use by the exemplary base-station 110. Also note that, in various embodiments, the default communication fields 722 may be eliminated due to its redundant nature.

Figure 8:
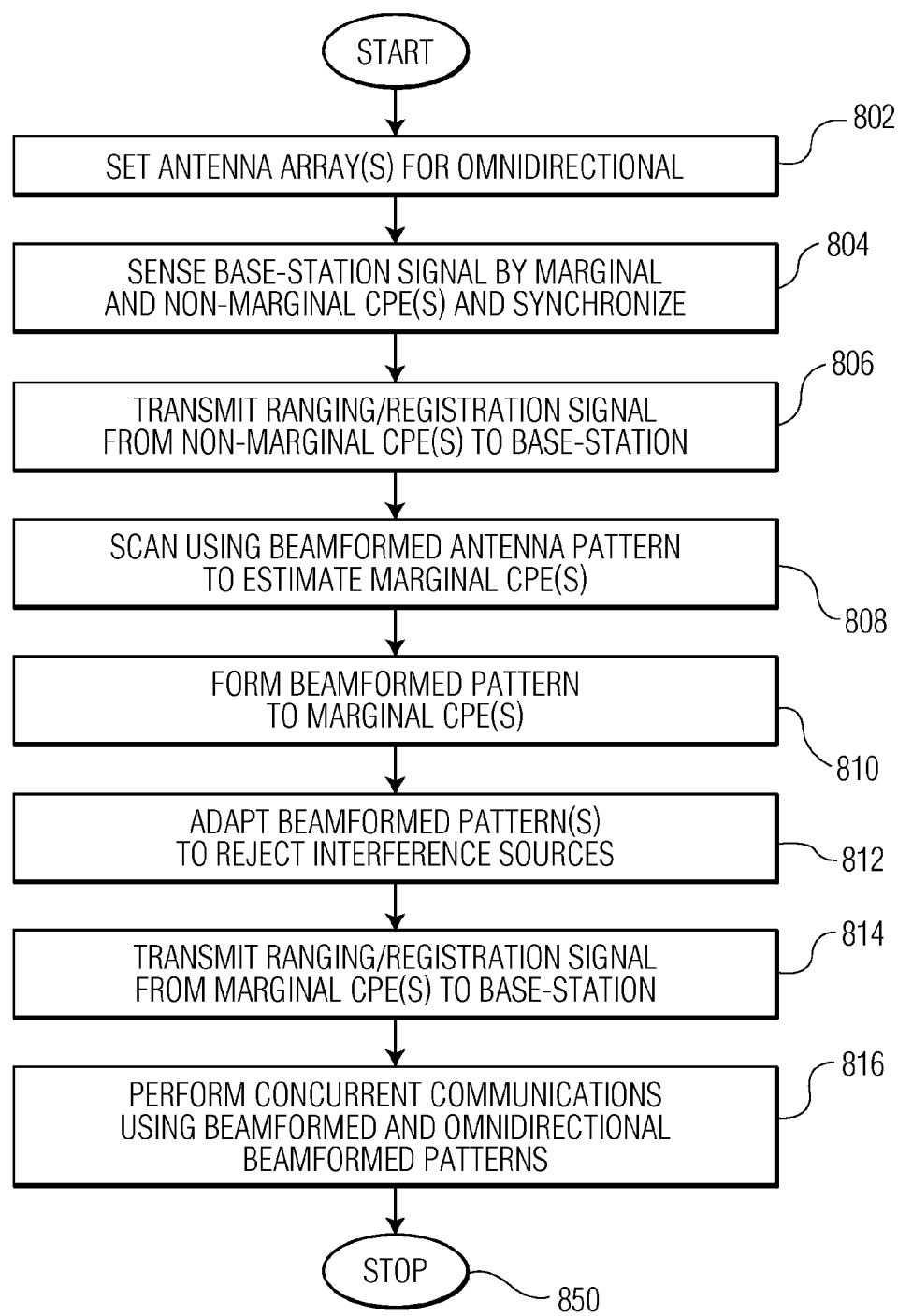
FIG. 8 is a flowchart outlining a first series of exemplary steps useful for communicating according to the disclosed methods and systems.

FIG. 8 is a flowchart outlining a series of exemplary steps useful for communicating according to the disclosed methods and systems. The process starts in step 802 where a base-station having an adaptive antenna array can transmit a wireless signal having a particular wireless protocol, such as the protocol outlined in FIGS. 2 and 4, using an omnidirectional antenna pattern. Next, in step 804, the various CPEs, both close (non-marginal) and distant (marginal), within sufficient range of the base-station can synchronize to the base-station's transmitted signal. Then, in step 806, the non-marginal CPEs can transmit some form of registration signal to the base-station using a particular time-window, such as the AW discussed with respect to FIG. 2, and communication between the non-marginal CPEs and the base-station can commence. Control continues to step 808.

In step 808, the base-station can estimate the location or relative direction of any marginal CPEs. While the exemplary estimation technique can use any number of scanning and adaptation processes, such as those discussed above with respect to FIGS. 3A and 3B, the estimation of CPE location or relative direction can be accomplished by any number of known or later developed approaches, such as referencing a database of such information. Control continues to step 810.

In step 810, the estimated beamformed antenna pattern can be formed towards the marginal CPE(s). Next, in step 812, the estimated beamformed antenna pattern optionally can be adapted to reject sources of interference. Then, in step 814, (similar to step 806) the marginal CPEs can transmit some form of registration signal to the base-station using a particular time-window, such as the AW discussed with respect to FIG. 2, and communication between the (previously marginal) CPEs and the base-station can commence. Control continues to step 816.

In step 816, the base-station can concurrently communicate with the non-marginal CPEs using an omni-directional antenna pattern and one or more marginal CPEs using one or more beamformed antenna patterns using any number wireless protocols, such as that described in FIG. 4 and its respective text. Control then continues to step 850 where the process stops.

Figure 9:
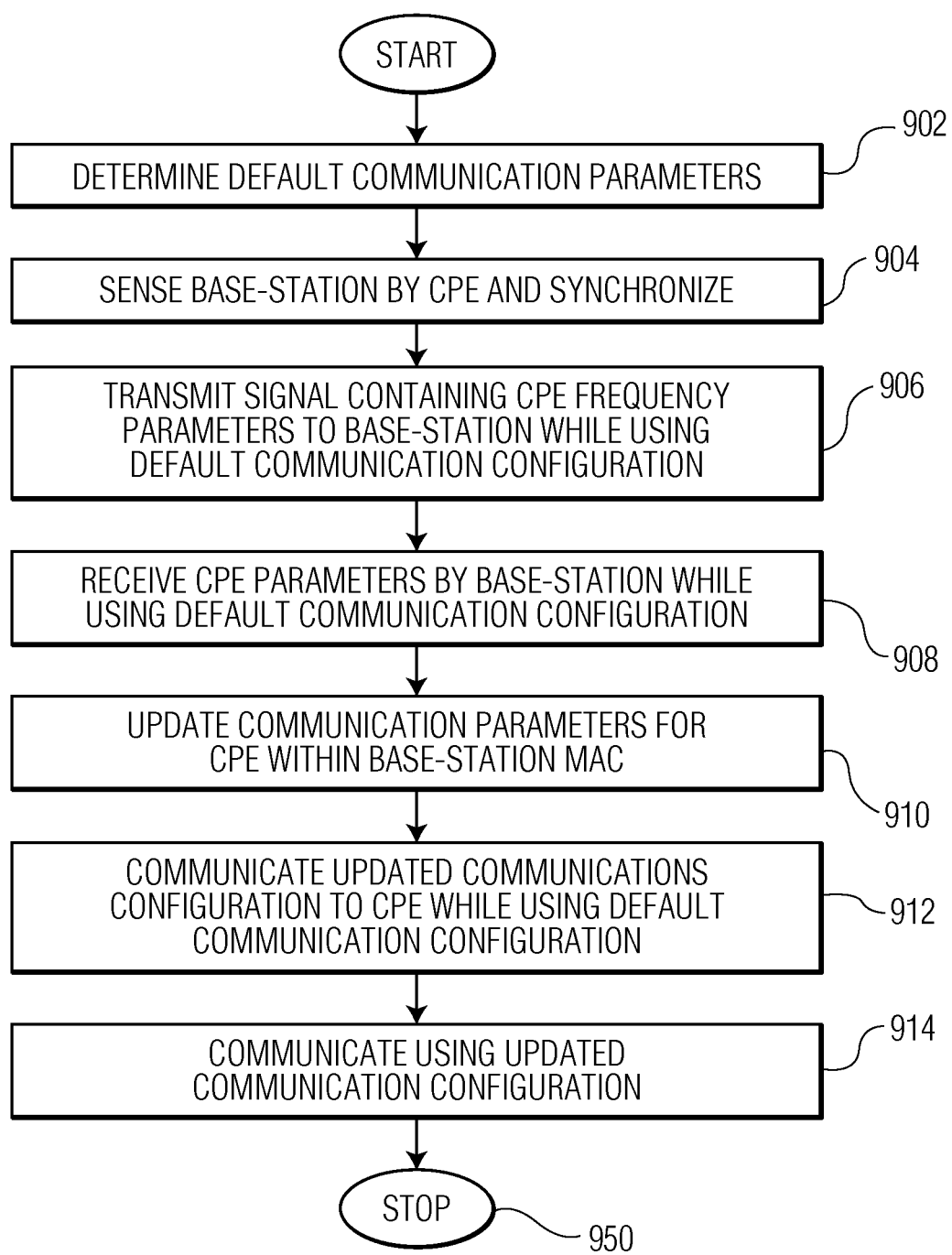
FIG. 9 is a flowchart outlining a second series of exemplary steps useful for communicating according to the disclosed methods and systems.

FIG. 9 is a flowchart outlining a series of exemplary steps useful for communicating according to the disclosed methods and systems. The process starts in step 902 where a set of default frequency communication parameters for CPEs are determined, such as a default frequency bandwidth, frequency spectrum and so on. Then, in step 904, a CPE can sense a base-station's transmitted signal, and synchronize to the base-station using timing information embedded in the base-station's transmitted signal. Control continues to step 906.

In step 906, the CPE can transmit some form of configuration information relating to the CPE's frequency-related capabilities using a particular time-window, such as the AW discussed with respect to FIG. 2, and in step 908 the base-station can receive the configuration information using a default frequency configuration determined by the default frequency parameters of step 902. Control continues to step 910.

In step 910, the base-station can update its protocol based on the update frequency parameters, and allocate frequency resources to enable the base-station to communicate with the CPE using an updated configuration based on the updated frequency parameters. Next, in step 912, the base-station can communicate the allocated/updated frequency configuration to the CPE using the default frequency configuration and/or by some special information field, such as the SCH field of FIG. 2. Then, in step 914, the base-station and CPE can communicate in a manner consistent with the updated frequency configuration. Control then continues to step 950 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A communications base-station configured to operate as a hub in a wireless network and provide communication services to a set of remote customer devices using a wireless protocol, comprising:
    an antenna array having a plurality of antennae arranged in a fashion as to enable the antenna array to transmit and receive wireless signals using both a substantially omni-directional and non-omnidirectional pattern;
    a physical layer (PHY) device coupled to the antenna array and configured to transmit and receive wireless signals;
    a media access control (MAC) device coupled to the PHY device and configured to:
        direct the antenna array to concurrently provide beamformed wireless signals to a first customer device and omnidirectional wireless signals to second customer device, both the first and second customer devices being included in the set of remote customer devices; and
        produce a communications protocol having a repeating alert window used for receiving wireless burst signals from customer devices; and
    an estimator configured to estimate a relative direction of each customer device based at least in part on the wireless burst signals from the customer devices using the alert window;
    wherein the antenna array is directed to provide the beamformed wireless signals to the first customer device in response to the relative direction for the first customer device estimated by the estimator based on the wireless burst signal received from the first customer device.

2. The communications base-station of claim 1, wherein the estimator is configured to estimate the relative direction of each customer device using a measured signal strength of the received burst signals.

3. The communications base-station of claim 2, wherein the communications base-station is configured to periodically scan a region surrounding the communications base-station using a beamformed antenna pattern to locate customer devices.

4. The communications base-station of claim 2, wherein the MAC device is further configured to receive wireless signals using an adaptive beamforming technique capable of abating interference from at least one interference source.

5. The communications base-station of claim 1, wherein the estimator is configured to determine a relative direction of customer devices using a database containing at least one of a relative direction and a geographic location relating to at least one customer device.

6. The communications base-station of claim 1, wherein the MAC device uses a communications frame structure having an upstream portion and a downstream portion, and where each portion has both an omnidirectional and a beamformed section.

7. The communications base-station of claim 6, wherein the omnidirectional and beamformed sections of the downstream portion have separate preambles.

8. A method to provide communication services by a communications base-station to a set of remote customer devices using a wireless protocol, comprising:
    receiving wireless signals of the wireless protocol transmitted by a plurality of customer devices having different directions relative to the communications base-station;
    concurrently demodulating the received wireless signals for a first customer device using a beamformed wireless technique and for a second customer device using an omnidirectional wireless technique, both the first and second customer devices being included in the set of remote customer devices;
    producing a communications protocol having a repeating alert window used for receiving wireless burst signals from customer devices; and
    estimating the relative direction of each customer device to the communications base-station based at least in part on the wireless burst signals from the customer devices using the alert window;
    wherein the beamformed wireless technique is utilized for the first customer device in response to the relative direction for the first customer device estimated by the estimator based on the wireless burst signal received from the first customer device.

9. The method of claim 8, wherein the estimating includes repeatedly scanning for burst signals transmitted by the first customer device, then determining the respective relative direction using a plurality of measured signal strengths of the scanned burst signals.

10. The method of claim 8, wherein the beamformed wireless technique is an adaptive beamformed technique capable of abating interference from at least one interference source.

11. The method station of claim 8, wherein the received wireless signals are organized according to a frame structure where each frame has an upstream portion and a downstream portion, wherein each portion has both an omnidirectional and a beamformed section, and wherein the omnidirectional and beamformed sections of the downstream portion have separate respective preambles.

12. The method station of claim 8, wherein the received wireless signals are organized according to a frame structure where each frame has an upstream portion and a downstream portion, wherein each portion has an omnidirectional and multiple beamformed sections, and wherein the omnidirectional and beamformed sections of the downstream portion have separate respective preambles.

* * * * *